W. H. GEORGE.

DRIVING MECHANISM.

APPLICATION FILED MAY 26, 1914.

Reissued Nov. 28, 1916.

14,223.

2 SHEETS—SHEET 1.

Witnesses
Philip E. Barnes
A. A. Hammond

Inventor
William H. George
By Vernon E. Hodges
his Attorney

THE NORRIS PETERS CO., PHOTO-LITHO., WASHINGTON, D.

W. H. GEORGE.

DRIVING MECHANISM.

APPLICATION FILED MAY 26, 1914.

Reissued Nov. 28, 1916.

14,223.

2 SHEETS—SHEET 2.

Witnesses

Philip E. Barnes

A. C. Hammond

Inventor

William H. George

By Vernon E. Hodges his Attorney

THE NORRIS PETERS CO., PHOTO-LITHO., WASHINGTON, D. C.

UNITED STATES PATENT OFFICE.

WILLIAM H. GEORGE, OF FAIRFIELD, IOWA, ASSIGNOR TO DEXTER MANUFACTURING COMPANY.

DRIVING MECHANISM.

14,223. Specification of Reissued Letters Patent. Reissued Nov. 28, 1916.

Original No. 1,030,993, dated July 2, 1912, Serial No. 532,333, filed December 10, 1909. Application for reissue filed May 26, 1914. Serial No. 841,080.

*To all whom it may concern:*

Be it known that I, WILLIAM H. GEORGE, a citizen of the United States of America, and resident of Fairfield, county of Jefferson, and State of Iowa, have invented a new and useful Driving Mechanism, of which the following is a specification.

The object of this invention is to provide an improved construction for a hand-motor which may be employed in operating a washing-machine or other device.

My invention consists in the construction, arrangement and combination of elements hereinafter set forth, pointed out in my claims and illustrated by the accompanying drawing, in which:—

Figure 1:
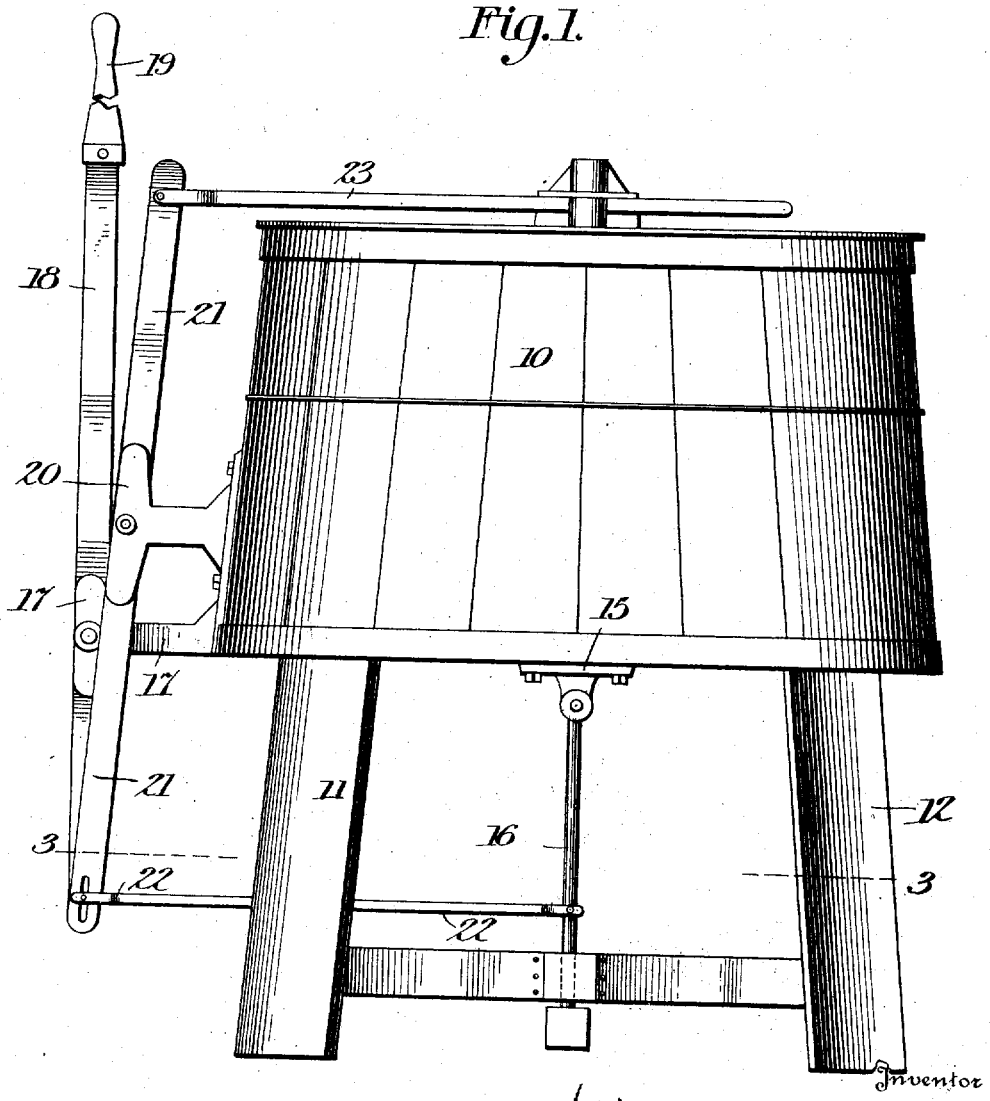
Figure 2:
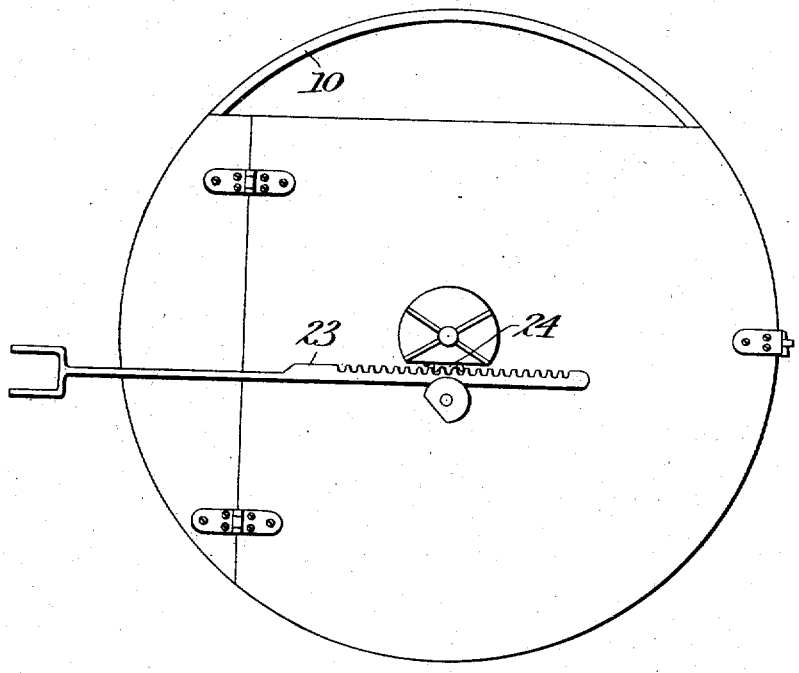
Figure 3:
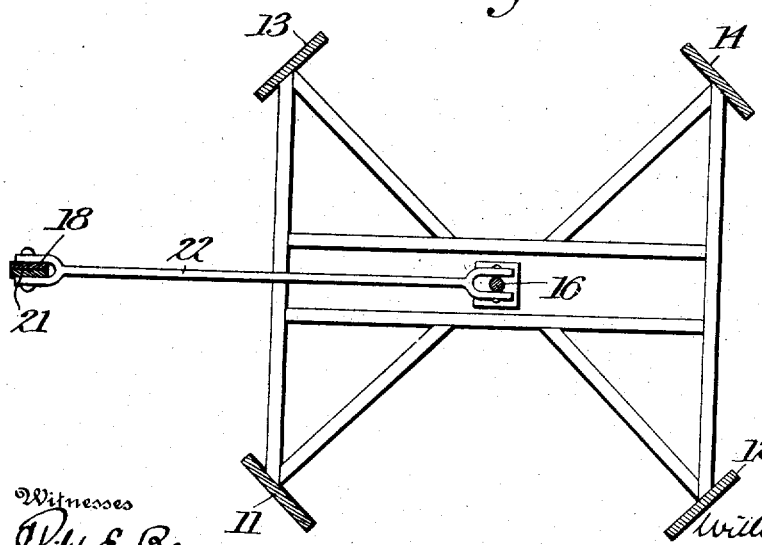

Figure 1 is a side elevation of the complete machine, Fig. 2 is a plan of the machine, the levers being removed, Fig. 3 is a cross-section on the indicated line 3—3 of Fig. 1.

In the construction of the machine as shown, the numeral 10 designates a tub carried by legs 11, 12, 13 and 14 and serving in this instance as a support for the hand-motor and the devices operated thereby. A bearing-plate 15 is mounted horizontally on the bottom of the tub 10. A pendulum 16 is pivoted on and depends from the plate 15 centrally of and beneath the tub. A bracket 17 is fixed to and projects horizontally and radially from the lower portion of the tub 10, and a hand-lever 18 is fulcrumed near its lower end on and is arranged vertically relative to said bracket. The hand-lever preferably is made of metal and is provided with a removable handle 19 on its upper end, which handle is preferably made of wood. A bracket 20 is fixed to and projects laterally from the tub 10 in a plane above the bracket 17, and a lever 21 is fulcrumed at its center on said bracket 20. The lower end portions of the levers 18 and 21 are conjunctively pivoted to one end portion of a pitman 22 and the opposite end portion of said pitman is pivoted to the pendulum 16 at a point between its ends. A pitman 23 is pivoted at one end to the upper end of the lever 21 and is adapted to engage a device to be driven, such as a pinion 24. In this instance the pinion 30 is mounted on and adapted to turn rotatively an agitator or dolly within the tub. It will be observed that the leverage of the operator on the pitman 22 through the medium of the lever 18 is considerably more than equal.

In practical operation the lever 18 is oscillated manually and effects an oscillation of the lever 21 and reciprocation of the pitmen 22, 23. The pitman 23 acts upon and operates the device or mechanism to be driven adapted to do the work provided for it. The pitman 22 oscillates the pendulum or momentum gatherer 16 and stores momentum therein. When manual operation is relaxed from the lever 18, the pendulum 16 continues to oscillate for a time and acts through the pitman 22 to the oscillation of the lever 21 and continuing reciprocation of the pitman 23. It is the function of the pendulum in this connection to overcome a temporary overload of the pitman 23, and to maintain a uniformity of oscillation of the lever 21.

I claim:

1. A driving mechanism comprising a support, two levers fulcrumed upon said support, a momentum-gatherer on one side of said support, means extending from said momentum-gatherer to one end of each lever, and means connecting the other end of one of said levers with the mechanism to be driven on the other side of said support.

2. A driving mechanism comprising a support, two levers fulcrumed upon said support, a momentum-gatherer on one side of said support, common means extending from said momentum-gatherer to one end of each lever, means connecting the other end of one of said levers with the mechanism to be driven on the other side of said support, and means on one of said levers by which it is oscillated.

3. A driving mechanism comprising a support, two levers fulcrumed upon the support, said levers being connected at one end, a momentum-gatherer, means comprising a rod extending from said momentum gatherer to the joined ends of said levers, a handle on one of said levers, and means connecting one end of the other lever with the mechanism to be driven.

4. A driving mechanism, comprising a suitable support and legs therefor, a hand lever fulcrumed intermediate of its ends on one side of said support, another lever arranged contiguous and parallel to and on the same side of the support with the hand lever and fulcrumed intermediate of its ends to said support, the axis of articulation of the second lever being parallel with and above the axis of articulation of the first lever, pivotal connections between the lower ends of said levers, a pitman pivoted to the upper end of the second lever, means for applying said pitman to a load, a pendulum pivoted to and depending from the central portion of the support, and a pitman forked, embracing and pivoted at one end conjunctively to the lower ends of the levers and pivoted at the other end to and intermediate of the ends of the pendulum.

5. A driving mechanism, comprising a suitable support and legs therefor, a hand lever fulcrumed intermediate of its ends on one side of said support, another lever fulcrumed intermediate of its ends to said support, the axis of articulation of the second lever being parallel with and above the axis of articulation of the first lever, the lower ends of said levers formed with longitudinal registering slots, a pin extending through said slots, a pitman pivoted to the upper end of the second lever, means for applying said pitman to a load, a pendulum pivoted to and depending from the central portion of the support, a pitman pivoted at one end on the pin in and conjunctively to the lower ends of the levers and pivoted at the other end to and intermediate of the ends of the pendulum, bars connecting said legs in pairs, parallel guide bars connecting the first bars and arranged on opposite sides of the path of the pendulum, and braces connecting said parallel guide bars to end portions of the first bars.

In testimony whereof, I have signed my name to this specification in the presence of two subscribing witnesses.

WILLIAM H. GEORGE.

Witnesses:
ALORA HARDENBERG,
R. D. HUNT.

Copies of this patent may be obtained for five cents each, by addressing the "Commissioner of Patents, Washington, D. C."